United States Patent [19]

Stiennon

[11] Patent Number: 5,568,901

[45] Date of Patent: Oct. 29, 1996

[54] TWO STAGE LAUNCH VEHICLE AND LAUNCH TRAJECTORY METHOD

[75] Inventor: Patrick J. G. Stiennon, Madison, Wis.

[73] Assignee: William Henry Gates, Redmond, Wash.

[21] Appl. No.: 283,739

[22] Filed: Aug. 1, 1994

[51] Int. Cl.[6] .............................. B64C 37/02; B64D 5/00; B64F 1/04; B64G 1/40

[52] U.S. Cl. ........................ 244/63; 244/158 R; 244/172; 244/2

[58] Field of Search ............................ 244/158 R, 158 A, 244/160, 162, 163, 172, 63, 2

[56] References Cited

U.S. PATENT DOCUMENTS

| | | | |
|---|---|---|---|
| 2,977,080 | 3/1961 | VonZborowski | 244/2 |
| 3,000,593 | 9/1961 | Eggers et al. | 244/2 |
| 3,262,655 | 7/1966 | Gillespie et al. | 244/172 |
| 3,285,175 | 1/1964 | Keenan | 102/49 |
| 3,286,629 | 11/1966 | Laue | 244/172 |
| 3,702,688 | 11/1972 | Faget | 244/2 |
| 4,265,416 | 5/1981 | Jackson et al. | 244/2 |
| 4,709,883 | 12/1987 | Gialiani et al. | 244/63 |
| 4,796,839 | 1/1989 | Davis | 244/172 |
| 4,844,380 | 7/1989 | Peoples | 244/63 |
| 5,090,642 | 2/1992 | Salheld | 244/158 R |
| 5,129,602 | 7/1992 | Leonard | 244/172 |
| 5,143,327 | 9/1992 | Martin | 244/172 |
| 5,172,875 | 12/1992 | Fried | 244/172 |
| 5,295,642 | 3/1994 | Palmer | 244/2 |

OTHER PUBLICATIONS

Bruckner et al. "Antares: A Low Cost Modular Launch Vehicle Concept" IAF 92–0859 Aug. 1992.

Aldrich "NASA's Access to Space Study" pp. 1–12 Nov. 1993.

"Two Stage Launch Vehicle and Launch Trajectory Method" Stiennon Aug. 7, 1994, pp. 1–20.

Staehle, et al. "Crew transportation for the 1990's", World Space foundation, 1989.

Hudson "Phoenix: A Commercial, Reusable Single-Stage Launch Vehicle" Pacific American Launch Systems Inc. pp. 1–13.

"A Rocket Ship has landed on Earth" DeltaClipper Oct. 1993 pp. 10–11.

Primary Examiner—Andres Kashnikow
Assistant Examiner—Virna Lissi Mojica
Attorney, Agent, or Firm—Patrick J. G. Stiennon

[57] ABSTRACT

A method of launching a two stage vehicle and a trajectory for use with a two stage vehicle which allows recovery of both stages at the launch site. This is accomplished by launching the first stage completely vertically so that on burnout the first stage is positioned directly above the recovery site. In order to get maximum benefit from launching the stage vertically gravitational losses are minimized by a first stage thrust to weight ratio of 1.6. The high thrust to weight ratio results in burnout at approximately 100,000 feet altitude within the atmosphere. Therefore the vehicle employs engines which produce at altitude approximately 15 percent of the sea level thrust of the first stage and consume the last 5 percent of propellant over a time period of 40 seconds. Staging is accomplished at 200,000 feet altitude. The second stage employs uprated RL-10 engines and has a thrust to weight ration of 1.45 and can achieve orbit with a velocity change of approximately 24,500 feet per second. The first stage employs air breathing vertical lift engines for recovery. The second stage utilizes a parawing.

16 Claims, 3 Drawing Sheets

TWO STAGE LAUNCH VEHICLE AND LAUNCH TRAJECTORY METHOD

FIELD OF THE INVENTION

This invention relates to launch vehicles for transporting goods and personnel from the surface of the earth to low earth orbit. It also relates to the trajectory or path which the launch vehicle follows in achieving earth orbit.

BACKGROUND OF THE INVENTION

The Cost of Space Transportation. The cost of transporting a payload to a low earth orbit can be assessed in terms of the energy required to place a pound in orbit. A pound in orbit has the kinetic energy equal to approximately 3.8 kilowatt hours per pound. When aerodynamic drag and other losses encountered in placing a pound in orbit are taken into consideration the energy required rises to approximately 5.25 kilowatt hours per pound. With the electricity costing ten cents a kilowatt hour, a perfectly efficient machine using electricity to place a payload in orbit would do so at a cost of $0.50 per pound It is this basic calculation regarding energy and cost that has led some people to speculate that low cost space transportation can only be achieved by an elaborate apparatus employing electricity such as electromagnetic cannon or various exotic rotating skyhooks and the like. In fact ordinary rocket technology is relatively efficient. For instance the Saturn V launch vehicle which was used to send men to the moon placed one pound in orbit for every 22 pounds of fuel used. The majority of fuel, or more precisely propellants, utilized consisted of liquid oxygen—an industrial commodity costing perhaps five cents a pound. The other fuels utilized by the Saturn V were RP1—a special grade of kerosene—and liquid hydrogen. RP1 is relatively expensive, perhaps a dollar or more a pound, however similar propellants such as liquified propane and liquified natural gas which have better performance cost between 10 and 20 cents a pound. Liquid hydrogen costs $1 to $3 a pound.

The cost of the fuel for a reasonably efficient launch vehicle such as the Saturn V amounts to between three and five dollars per pound placed in orbit. This simple calculation shows the rocket to be a relatively efficient transportation device.

In other transportation systems, for example airlines, the cost of transport may be on the order of two and a half times the fuel cost. This would place the cost of placing a pound in orbit at approximately $10 a pound. On the other hand, in operating the family car the cost of the fuel is about three cents a mile or perhaps one tenth the overall cost of transportation by car. If these standards were to apply to launch vehicles the cost of transporting a pound to orbit might be expected to be somewhat less then $30 a pound. In fact, existing transportation systems, at least in the Western world, cost between five and ten thousand dollars to place a pound in orbit. Accurate costs for Russian and Chinese launch systems are not available but are speculated to be several times less costly than European, Japanese, or United States launch systems. Nevertheless, there is a disparity factor of between 100 and 1,000 between the actual cost of space launch and what it might be expected to cost on the basis of physics and economic comparisons with other transportation systems.

One of the underlying reasons why space transportation has so far failed to drop sufficiently in cost over time relates to the so-called mission model or market for space transportation. Up to this time all space transportation systems have been developed by governments. Governments need a sound basis for justifying the expenditure of public funds. Thus, rather than look at the prospective increased market for space transportation as the cost falls, governmental agencies such as NASA and the Air Force have looked to the currently manifested payloads and some reasonable projection therefrom to determine the potential size of the space launch capability which can be reasonably justified.

Current United States space launch capability is equivalent to approximately 600,000 pounds a year placed into low earth orbit. Rarely have mission models projected a requirement of more than 2 million pounds a year into orbit. This space transportation model combined with a preference for launching large payloads has meant that most government studies considering new space transportation systems have focused on maximum launch rates of 40 to 80 launches a year.

At the same time government planners of launch systems typically must consider five to twenty launches as more likely to be flown and therefore typically make the trade-off between development costs and recurring flight costs based on this lower range of five to twenty flights a year. With the rise of systems engineering, space system design has been managed and planed within a system which dictates that space systems must be built to a set of predetermined requirements which in turn are derived from a combination of political considerations, mission models, and budgetary constraints.

By the time the requirements have been set and design of the vehicle is handed over to the vehicle designers, any designs capable of achieving low launch costs are invariably inconsistent with the requirements and so are not presented by designers for consideration. As an example of this dilemma consider a fully reusable launch vehicle capable of putting 20,000 pounds into low earth orbit and having a turn-around time of 48 hours. If a very small fleet of this vehicle (small, that is, in comparison to any other transportation system), say 20 vehicles, were built and flown at design capability, the yearly payload transported to low earth orbit would be approximately 80 million pounds—forty times higher than even the more optimistic mission models put forth by government and industry planners.

A modern airliner such as the Boeing 777 has a development cost of two or three billion dollars. If only four airframes were built and if each plane made two flights a year the true cost of a coast to coast flight for one person could easily exceed a quarter of a million dollars, not counting the facility costs involved in the airports, the air traffic control systems, the supply and maintenance systems, etc. Thus one part of the problem of developing low cost space transportation has been improper choice of the mission model which has led to improper criteria for the vehicle design.

The other difficulty is that no known vehicle design has been demonstrated to be capable of achieving routine reusable operation within the current state of the art of available space systems. The one exception to this may be the mass production of an expendable launch vehicle which logically would result in some fairly significant overall reduction in cost. This appears to be what the Russian launch capability has achieved and accounts for their significantly lower launch costs as opposed to United States, Europe, and Japan.

However the degree to which costs may be reduced through this approach is limited.

One proposed approach to providing a cost-effective launch vehicle is to build a vehicle like an airplane on the basis that if it looked like an airplane it may cost like an airplane. From such a philosophy vehicles such as the NASP (National Aerospace Plane) and HOTOL have arisen. However these systems face fundamental technical challenges. Hypersonic air-breathing flight beyond Mach 3 or 4 has not been demonstrated. Nor have necessary subsystems such as the propulsion system, the heat shield system, or the tankage system. Thus such systems as the NASP, while perhaps technically possible, represent tremendously costly investments with the very real possibility of never achieving success. To date over two billion dollars have been spent on the NASP concept without leading to even the production of a demonstration vehicle.

Another low cost launch system concept is the use of a single-stage-to-orbit rocket. Achieving orbit with a single stage is a feasible and readily demonstrated proposition. Many past or existing stages can be shown to be capable of placing a payload in low earth orbit. Examples are the Atlas vehicle which if it does not stage its boost engines can marginally achieve orbit with zero payload. Other examples are the second and third stages of the Saturn V launch vehicle which, if they were reconfigured for ground launch, each would be capable of putting significant payloads into low earth orbit. The shuttle external tank, if integrated with the shuttle liquid propulsion system, can also be utilized to demonstrate the feasibility of a single-stage-to-orbit vehicle.

The ability of a rocket to achieve a given velocity is governed by the rocket equation. If the total velocity through which the payload must be accelerated is known and the average or effective ISP of the stage is known the mass ratio of the vehicle may be readily determined. The mass ratio is the initial or gross weight of the vehicle divided by the burnout or final weight. The total velocity required to reach low earth orbit is a combination of the orbital velocity of approximately 25,500 feet per second and various velocity losses which are incurred in a actual launch. These including losses due to drag, gravity and losses due to potential energy gained. The component of earth's rotational velocity which is aligned with the direction of launch is approximately 1 400 ft/sec and reduces the total velocity required to achieve orbit. Thus the total characteristic velocity is often taken to be between 29 000 and 30,000 feet per second for an eastward 28 degree latitude launch. A state of the art average-to-high performance launch vehicle using hydrogen engines would require a mass ratio to achieve low earth orbit of between eight and nine, meaning that between twelve and a half and eleven percent of the launch weight can be placed in orbit. Existing vehicle stages, particularly the Saturn V second and third stage have structural fractions on the order of nine or ten percent.

So such stages should be able to place between one and three percent of their gross weight, into low earth orbit as payload. While seemingly a minute fraction of the gross weight one to three percent is quite respectable compared to existing vehicles, with the shuttle achieving perhaps one percent and the Saturn 5 achieving somewhat over four percent. This would appear to demonstrate the feasibility of single stage to orbit transportation and does so, but only for expendable vehicles. A reusable vehicle by almost any realistic assessment requires an increase in the dry weight of the stage by approximately 30 percent to account for the heat shield and recovery system. Thus existing single stage to orbit designs generally fall into one of two classes. The vehicle designers assume an improvement in vehicle technology, in light weight structures, tanks, subsystems, and assume engines of improved performance and thrust to weight ratios. These vehicles suffer from problems similar to the air breathing concepts. As such as they have very high development costs without any assurance of eventual technical success. The other approach in developing single stage concepts is to assume less dramatic improvements in technology and so design a vehicle with a large gross takeoff weight in relation to the payload. Thus the payload fraction of this design choice is often less than one percent of the gross weight of the vehicle and less than ten percent the weight of the vehicle structure. This makes the vehicle extremely sensitive to small increases in the weight of the vehicle structure. A small overall increase in vehicle structure and subsystem weight results in no payload at all. The very small margin for weight growth results in an extremely risky development program in that a state of the art vehicle might be built and in the final analysis to have no payload capability.

The most logical approach would appear to be a two stage vehicle. And initially a two stage vehicle was proposed to follow the Apollo era and introduce reusable space transportation. However two stage vehicles are thought to have high development costs in that two optimized stages must be developed and built. Further because the first stage does not achieve sufficient velocity to circle the earth and so return to the launch site the first stage will typically, depending on vehicle design, reenter two to six hundred miles down range of the launch site. If the vehicle is launched over land, the recovery of the first stage is difficult. If the vehicle is to be launched over a range of orbit inclinations, landing the first stage and transporting the stage back to the recovery site is especially difficult. If the launch is conducted over water the first stage returns to a water landing where it is invariably contaminated by salt water. The salt water recovery can necessitate extensive refurbishment and at the same time ocean landings carry a small but significant loss associated with sea states and loss of buoyancy in the recovered stage. For a truly low cost system, even one vehicle lost in a hundred flights is a significant increase in overall operating cost.

The result of this analysis has in the past been an attempt to design a flyback first stage through the use of wings. This is a difficult design task as the empty stage has most of its mass concentrated in the engines and thrust structure which are located in the rear of the stage, so it is difficult to achieve a stable flying platform without significant weight penalties. Additional weight penalties are incurred if an air breathing propulsion system is carried on board. However without the air breathing system, risk of vehicle loss is increased. In either case facility costs are extensive in that wide long runways must be provided at every vehicle launch site. One concept which has been suggested is the so called popback booster where the first stage has sufficient propellant remaining after staging to flyback under rocket power to the launch site. This system while possibly feasible incurs a large penalty in performance and an increased complexity as the rocket propulsion system must be restarted after staging and must be capable of the significantly lower thrusts required for the popback maneuver. Another concept disclosed by U.S. Pat. No. 3,285,175 utilizes a first stage powered by air breathing turbo-rocket engines or other type of air breathing engine. The air breathing stage with an upper stage mounted thereto is launched vertically and recovered vertically at the launch site. This system, while providing theoretical advantages, has practical difficulties. Air breathing engines have thrusts to weight ratios in the range of six or less especially as flight velocity increase. The vehicle can not maintain thrust as the vehicle exits the atmosphere and this presents control or staging problems. Still another concept is that developed by E. Sanger and I. Bredt and later advocated by Philip Bono of launching the vehicle from a captive first stage which runs on track along the ground or up a mountainside. Such systems while improving on the performance of a single stage vehicle, are only capable of reducing velocity required by the orbital stage by little more than a thousand feet per second. Such concepts are often applied to the second type of single stage vehicle, one using near term technology and having very little payload fraction to marginally improve the payload fraction. However the cost of doing this is significantly increased vehicle design complexity and facility costs for very marginal improvement in vehicle performance. Another approach, which has been adopted by the shuttle, the Ariane V, Energia, and the H-2, is to employ a zero stage or half stage which consists of solid or liquid strap on boosters which burn in parallel with what is essentially a single stage vehicle thereby improving its performance sufficiently to achieve a reasonable payload fraction. If these systems were used in a fully reusable system they would have most of the problems associated with a two stage vehicle-that is, recovery of the first or aero stage down range. What is needed is a launch vehicle system which is fully reusable, demonstrably feasible with current technology having adequate performance margins, and which returns all stages to the launch site.

SUMMARY OF THE INVENTION

The invention is a method of launching a two stage vehicle and a trajectory for use with a two stage vehicle which allows recovery of both stages at the launch site. This is accomplished by the seemingly simple expedient of launching the first stage completely vertically so that on burnout the first stage is positioned directly above the recovery site. This concept of vertically launching the first stage of a two stage vehicle was considered by The Boeing Corporation "Boeing Heavy Lift Study" as a possible solution to the problem of recovering the first stage down range. However Boeing found that when the two stage vehicles they were considering were launched vertically the payload was reduced by approximately 70 percent and thus conclude use of such a trajectory was not workable or desirable. The invention herein is the discovery that with a properly chosen staging ratio the loss in payload caused by the completely vertical site of the first stage is only approximately one third. To determine the proper staging ratios can first be observed that if an orbital or second stage is launched by a first stage to a sufficient vertical height and/or velocity the first stage can supply all the velocity losses associated with the power flight of the vehicle launch such that the required velocity supplied by the second or orbital stage need only be the orbital velocity or 25 500 ft./sec. When earth's rotation velocity of approximately 1 400 feet per second is subtracted for an eastward launch the required stage velocity is only 24 000 feet per second. Further because the second stage operates entirely in a vacuum the ISP in the second stage will be the vacuum performance of the second orbital stage engines. Thus even off the shelf RL-10 Pratt & Whitney engines with an ISP of 444 seconds allow the design of a orbital stage having a mass ratio of between 5.3 and 5.8 which corresponds to a injected weight fraction of 17 to 19 percent of the orbital stage weight. The design of an orbital stage having a structural fraction of 12 or 13 percent is eminently achievable with existing technology and produces a orbital stage with a payload fraction of 4% to 7% of gross weight or 30% to 50% of burn out weight. To achieve the full advantage of the observation made above it is necessary to employ a vehicle designed to benefit from the improved trajectory set fourth above.

The conception of the vehicle and trajectory of this invention involved three steps. First after working on low cost pressure feed vehicle designs which have performance limitations it occurred to me that a low performance stage coupled with a almost single stage, upper stage might be a practical approach. While contemplating the low performance lower stage, high performance upper stage the optimal trajectory uniquely effective with the vehicle was realized. Finally a vehicle configuration necessary to practice implement the concept was developed.

An exemplary vehicle by which the principles disclosed are employed in to achieve a vehicle design of demonstrably feasibility with real possibilities for low cost operation is set forth herein. The vehicle is a two stage vehicle the first stage has a gross weight of 220,000 pounds of which 40,000 pounds are structure. And a second stage with a gross weight of 99 000 pounds 12 000 pounds of which are structure and 5 000 pounds of which are payload. This means the first stage has 180,000 pounds of propellant and the second stage has 82 000 pounds of propellant. The first stage employs engine technology such as currently in production for the Delta and the N-2 launch vehicles the first stage may be assumed to have an average ISP of 300 seconds and a mass ratio with the second stage as payload of 2.2 thus resulting in a characteristic stage velocity of 7 600 feet per second. In order to get maximum benefit from launching the stage vertically it is desirable to minimize the gravitational losses and this may be accomplished by increasing takeoff thrust. With optimal thrust being in the neighborhood of 1.6 the weight of the vehicle. With a 1.6 thrust to weight the vehicle experiences rapid increase in altitude without excessive aerodynamic drag or heating. Further because of the low mass ratio of the first stage the vehicle does not experience excessive G loading without throttling. However the high thrust to weight ratio results in burnout at approximately 100,000 feet altitude well within the atmosphere. Staging within the atmosphere would significantly complicate staging which is best achieved after drag forces are no longer significant. Therefore the vehicle employs vernier engines which produce at altitude approximately 15 percent of the sea level thrust of the first stage and consume the last 9 000 pounds of propellant over a time period of approximately 40 seconds. At end of this time the vehicle has climbed to approximately 200,000 feet altitude and aerodynamic drag is below a few hundred pounds force and thus staging may be safely accomplished. Further because of the high vertical velocity of the vehicle although the verniers are thrusting with less than a thrusting weight ratio of one considerable work is done on the vehicle. The work done by the low thrust engines is indicated by the force times distance which is the result of a rapid upward velocity of the vehicle at main engine shutdown of the first stage. The second stage if employing uprated RL-10 engines such as Pratt & Whitney has proposed having 24 000 pounds of thrust for a total thrust of 144 000 pounds or a thrust weight of 1.45 and can achieve orbit with a velocity change of approximately 24 500 feet per second. If existing off the shelf Pratt & Whitney RL-10-3A engines having 16 500 pounds of thrust at 444 seconds ISP are utilized the required velocity rises to approximately 25 500 due to some additional gravitational losses. The use of the catalog engines results in a reduction of payload of approximately 1 000 pounds or 20 percent of total the vehicle payload still representing a respectable payload fraction. The recovery systems for the two stages must be compatible with their overall systems and the first stage employ air breathing engines which are started during reentry at 60,000 feet and can bring the vehicle to a hovering condition before landing. Conventional air breathing engines have a thrust weight of six and thus with their accompanying structure and propellant system might weigh 25 percent of the dry weight or 10,000 pounds of the first stage the second stage would utilize a parawing. Parawings lifting 12 000 lb have been tested and a double redundancy parawing weighs only 5% of the recovered weight.

Reentry of the first stage occurs at a flight path angle of 90 degrees and a velocity of approximately 3,000 feet per second at 200,000 feet altitude. These reentry conditions result in minimal reentry heating and require little or no heat shield protection. Configuration of the second stage is conceived as a blunted cone with a half angle of 11 and ½ degrees. A cone terminates in a base 22 feet in diameter having a radius of curvature of approximately 32 feet. The vehicle enters base first with only sufficient trim to provide a lift to drag ratio of approximately 0.1. This lift to drag ratio can easily be provided for by an offset center of gravity. The slight lift to drag ratio is sufficient to keep reentry G forces below five while at the same time does not move the center of reentry heating sufficiently close to the edge of the juncture between the base and the sides of the vehicle so as to produce high local heat. Thus for a vehicle which presents a spherical surface to reentry heating the maximum heat rate is controlled solely by the radius of curvature, the ballistic coefficient, and the extent to which the reentry surface is catalyzing. Thus the vehicle upper stage heat shield 53 may be constructed of conventional ceramic blanket materials as reentry heating should be substantially lower than the 2,800 to 3,000 degree temperatures which can be sustained by these materials. Upon reaching terminal velocity at 60,000 to 40,000 feet altitude the parawing is deployed to provide gentle recovery. Parawing can provide air speeds of 40 to 60 mph which are sufficient to overcome winds aloft so that the vehicle may be precisely targeted to return to the launch site. The parawing may also be flared just before touchdown so that rates of descent may be well under 15 feet per second.

It is an object of the present invention to provide a two stage launch vehicle which can be constructed within the state of the art and which is reusable.

It is another object of the present invention to provide a two stage launch vehicle with low operating costs.

A further object of the present invention to provide a launch vehicle which is reusable has low operating costs and which is demonstrably feasible to construct with existing off the shelf technology.

It is a still further object of the present invention to provide a two stage reusable vehicle which is suitable for manned use.

It is yet another object of the present invention to provide the two stage launch vehicle which has a low development as well as a low operating cost.

It is yet further object of the present invention to provide a method of launching a two stage vehicle which allows recover of the first stage at the launch site.

DETAILED DESCRIPTION OF THE PREFERRED EMBODIMENT

Figure 1:
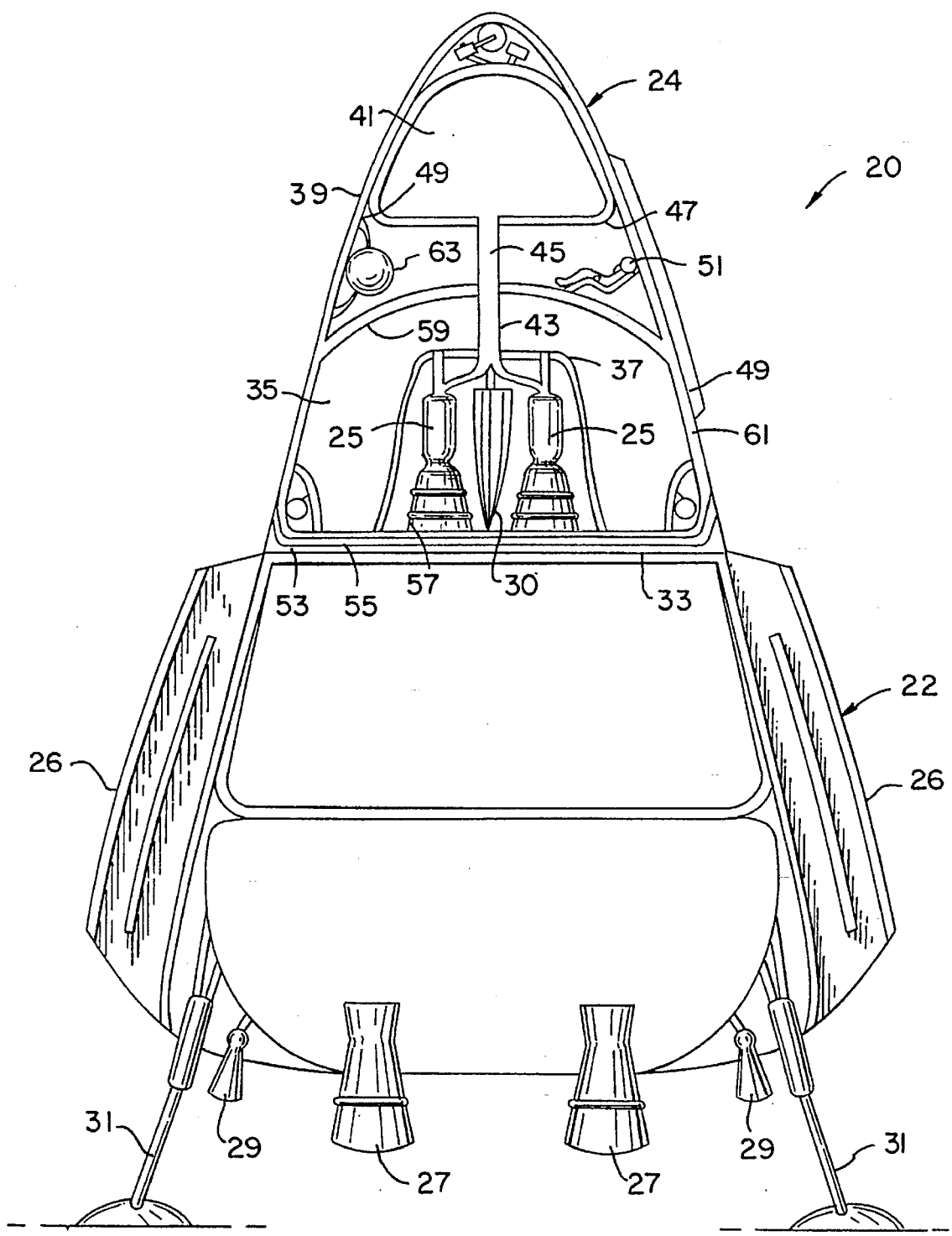
FIG. 1 is a cut away isometric view of the two stage launch vehicle stacked and ready for launch.
Figure 2:
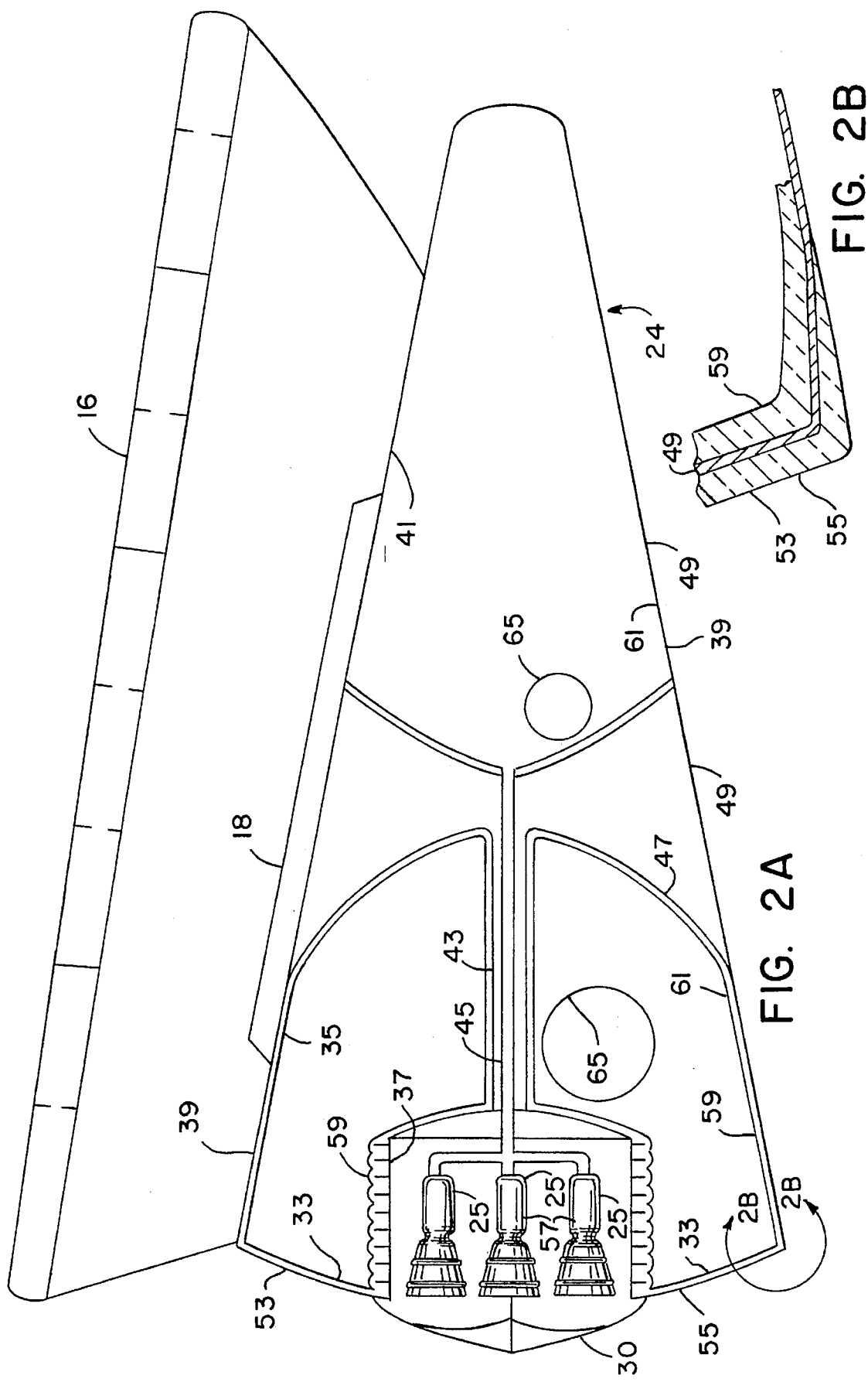
FIG. 2A is an cross-sectional view of the second stage of the launch vehicle of FIG. 1 landing with a parawing recovery system.
FIG. 2B is a enlarged detail view of the portion of FIG. 2A indicated by line 2B—2B.
Figure 3:
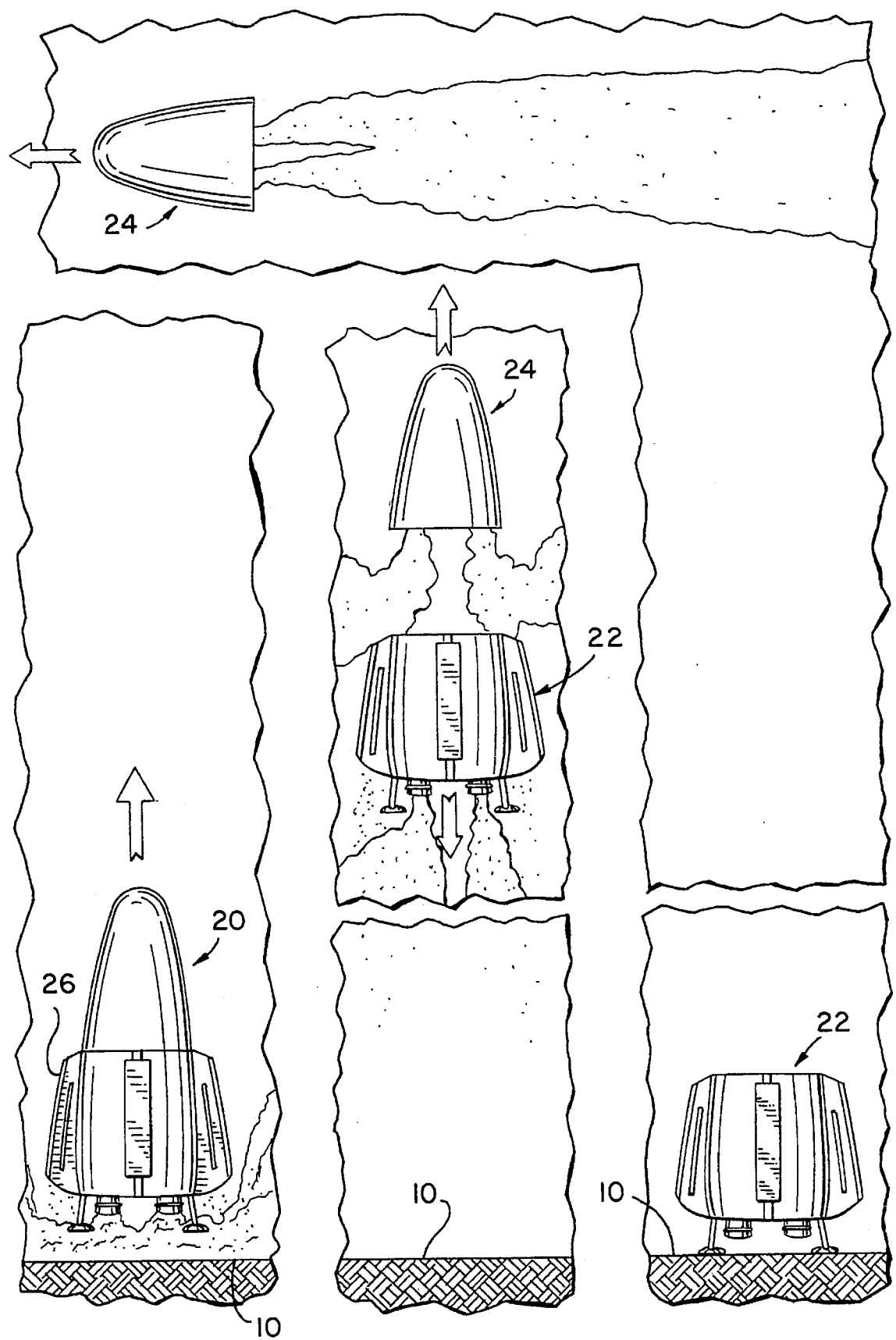
FIG. 3 is a schematic pictorial view illustrating the operation of the launch vehicle of FIG. 1.

Referring more particularly to FIGS. 1–3, wherein like numbers refer to similar parts, a two stage launch vehicle 20 is shown in FIG. 1. The vehicle has a first or lower stage 22 and a second or upper stage 24. The vehicle 20 has a gross launch weight of 320,000 pounds. This is divided into an upper stage weighing 99,000 pounds and a lower stage weighing 221,000 pounds. For purposes of performance calculations the lower stage has a sea level thrust of 512,000 pounds, a sea level ISP of 250 seconds, and a vacuum ISP of 324 seconds. The first stage 22 contains 181,000 pounds of propellant and has a 40,000 pound dry weight including residuals.

The second stage 24 has a gross weight of 99,000 pounds and a dry weight of 17,000 pounds including residual propellants and deorbit propellants. Of the 17,000 pounds 5,000 are payload. As shown in FIG. 3 the first stage 22 is launched vertically for approximately 83 seconds until the gross weight of the vehicle is reduced to 149,000 pounds. At this time the vehicle is at an altitude of approximately 110,000 feet. Because this altitude is still well within the atmosphere staging of the vehicle would be difficult. Therefore the thrust is reduced to 70,000 pounds and continued for an additional 41 seconds. At this point the vehicle is at 210,000 feet altitude where the drag is sufficiently low that staging may be readily commenced.

The total velocity of the vehicle at this point is 2,700 feet per second in a vertical direction. Total flight time for the first stage is approximately 124 seconds and the first stage reaches maximum aerodynamic drag at approximately 36,000 feet and experiences a maximum aerodynamic drag of 614 pounds per square foot which is no more than a conventional launch vehicle would experience. Losses due to drag are approximately 842 feet per second—a relatively typical number for a small blunt vehicle whereas gravity losses amount to 5,761 feet per second somewhat higher than normal.

The first stage has a mass ratio of 2.28 and a characteristic velocity of 8,600 feet per second. Characteristic velocity is the velocity which the stage would achieve in vacuum in the absence of gravity. The actual velocity the stage achieves, in this case 2 700 feet per second at burnout, is as a result of the losses due to drag, atmospheric back pressure on the engines, losses due to burning in a gravitational field, and losses due to a gain in potential energy as the vehicle gains altitude. These last losses are not true losses in the sense that they add to the performance of the vehicle.

The first stage 24 has an initial or gross weight of 99,000 pounds, a thrust weight of 1.24, and a vacuum ISP of 444 seconds. Of the burnout weight of 17,000 pounds the stage has a mass ratio of 5.82 and a characteristic velocity of 25,200 feet per second. If the vehicle 20 is launched from 28 degrees North in an eastwardly direction the rotation of the earth adds approximately 1,400 feet per second to the second stage's velocity. Thus, in order to achieve orbit at 100 nautical miles altitude, the theoretical velocity needed to achieve orbit is reduced from the orbital velocity of 25,500 feet per second at 100 nautical miles to 24 100 feet per second.

The upper stage 24 has a characteristic velocity which is approximately 1,000 feet per second greater than that required to achieve orbit. This 1,000 feet per second represents gravitational losses at the first stage 24 which can be completely eliminated by increasing the thrust to weight ratio. Total flight time from launch to orbital injection is approximately 422 seconds.

The upper stage 24 of the vehicle utilizes six Pratt & Whitney advanced RL-10 derivative engines having a vacuum thrust of 20,000 lbs which are based on the RL-10 A-3A and is assumed to have a weight of 325 pounds. Existing RL-10 A-3A engines have a weight of 310 pounds, a vacuum thrust of 16,500 pounds, and a specific impulse of 444.4 seconds. Utilizing existing RL-10 A-3A engines results in a thrust of 99,000 pounds, with the result that the vehicle experiences approximately another 1,000 feet per second of gravitational losses with a resulting lost payload of approximately 1,000 pounds.

The key advantage in exploiting the new launch trajectory (that of launching the first stage vertically and the second stage providing all the orbital velocity) is the effect this trajectory design has on feasibility of building the individual stages 22, 24 which make up the vehicle 20. Because the first stage provides a relatively low velocity increment and thus has a low mass ratio the stage has low development risks. Thus for every pound in weight which the first stage gains through conservative engineering design the total weight of the vehicle need only be increased by 1.2 pounds of additional propellant. The first stage is insensitive to weight growth. Further the first stage is relatively insensitive to changes in assumptions regarding the first stage ISP. Because the lower stage always remains essentially over the launch site guidance can be extremely simple involving active or passive ranging and position calculations from landmarks or beacons at the launch site.

Because of the relatively low burnout velocity at approximately 2,700 feet per second, the first stage 24 while entering the atmosphere vertically enters at its exit velocity of 2,700 feet per second and thus experiences low levels of aeroheating during its reentry. Further the mass ratio of the first stage makes feasible the use of air breathing engines with a relatively low thrust to weight ratio for recovery of the first stage.

The air breathing engines 26 are arrayed about the exterior of the vehicle as shown in FIGS. 1 and 3. During reentry at between 60,000 and 40,000 feet the engines 26 are started and thrust is gradually built up until the first stage 22 is brought to a hover over the landing site 10 where it executes a zero or near zero velocity touchdown. The first stage 22 thus returns to the launch site 10 approximately seven or eight minutes after launch. This rapid turnaround of the first stage 22 means that in a fleet of vehicles 20 considerably fewer first stages 22 might be required than second orbital stages 24.

Because of the advantage of continuing to thrust at a low level until the vehicle clears the atmosphere the vehicle is conceived as having a large main engine or engines 27 which are fixed and four two-axis gimbaled engines 29 which are outboard of the fixed engines 27 and which supply some 54,000 pounds of sea level thrust at launch and also supply the attitude control for the first stage 22. One-axis gimbaling would be sufficient for a thrust vector control but two-axis control makes the engines 27 redundant in that the vehicle can be controlled as long as one or more of the control engines 27 continues functioning.

The first stage engine utilizes low cost completely volatilizing propellants, preferably liquid oxygen and liquid methane or sub-cooled liquid propane. For historic reasons the hydrocarbon used in existing launch vehicles such as the Delta is a special grade of kerosene designated RP-1. Kerosene, however, is a mixture of hydrocarbons which varies from lot to lot within a specified range. RP-1 is kerosene which is specified to vary within narrow range. This requirement of tightly controlled specification significantly increases the cost of RP-1 kerosene. Propane and methane on the other hand constitute a single molecular species and are purer as commercially specified. Thus the use of methane or propane results in a propellent which is extremely consistent without incurring additional costs.

Because the lower stage is not weight critical the layout of the propellent tanks, landing struts 31, and engine attach brackets is not critical. However for the second stage, where every additional pound of weight decreases payload by one pound, the feasibility of the vehicle depends on careful attention to vehicle weight.

The engines 25 the vehicle utilizes are existing RL-10 A-3A or derivative models and are taken as weighing 325 pounds, thus giving an engine weight for the second or upper stage 24 of 1 950 pounds. The rest of the subsystems may roughly be broken down as 650 pounds for engine mounts, plumbing, and valuing; 600 pounds for the base shield 53; 1,000 pounds for avionics and manned systems; 1,200 pounds for the recovery systems; and 6,600 pounds for vehicle structure, tank insulation, and residuals.

Although the vehicle might optimally be designed as an ogive or other complex volume of revolution, the feasibility of the vehicle may be demonstrated for a simple conic configuration as illustrated in FIGS. 1 and 2. The vehicle is conceived as being a truncated cone 39 approximately 44 feet long and having a 22 foot diameter base 33, the base 33 having a 32 foot radius of curvature. Immediately adjacent to the base 33 is the hydrogen tank 35 in which is centrally located the six RL-10 engines 25. The engines 25 are in an engine module 37 which may be removed for maintenance and repair.

The oxygen tank 41 is located at the opposite end of the truncated cone 39. Because liquid oxygen is approximately 84 percent of the weight of the propellants, which are in turn 82 percent of the gross weight of the vehicle, placement of the oxygen tank 41 forward moves the center of gravity of the vehicle forward which improves the dynamic stability of both the second stage 24 and the first stage 24, when the first stage 24 is mounted thereon. A central passage 43 is defined through the hydrogen tank 35, An oxygen feed tube 45 extends through the central passage 43 and brings the oxygen from the upper tank 41 through the hydrogen tank 35 to the engine module.

The payload bay 47 is positioned between the liquid oxygen tank 41 and the hydrogen tank 35 in the first stage 24. By placing the payload bay 47 between the two tanks the marginal weight required for construction of the payload bay 47 is only the weight of the additional wall structure 49 separating the liquid hydrogen tank 35 and the liquid oxygen tank 41 and in practice very little weight need be attributed to the payload bay.

Some designers in considering the structural design of a reusable single stage to orbit vehicle have proposed advanced structural concepts involving welded honeycomb super alloy, composites and multi component structures.

However, for the upper stage 24 a monocoque aluminum structure is assumed. A vehicle structure must perform many functions. First, it must function as a pressure vessel to hold the propellants. The propellants are generally stored at pressures of 15 to 30 pounds per square inch in order to provide necessary suction head for the pumps. Second, the vehicle structure also must support the propellants and transmit loads between the engines 25 and the other components of the vehicle. Third, the vehicle structure must resist exit heating, reentry heating and provide cryogenic insulation for the propellants. Some designs have been proposed which have a separate structure to fulfill each of these functions but I believe an integrated structure may prove to be of lower cost, lighter weight and greater durability.

The truncated cone structure 39 consists of a single monocoque aluminum shell which serves both to enclose and contain the propellants utilized. The propellant tanks are under internal pressure. This internal pressure provides structural support connecting the first stage 24 engine and the first stage 22 thrust loads to the other components of the vehicle.

The major structural elements of the upper stage 24 are designed in tension and therefore buckling need not be considered in the liquid oxygen and the hydrogen tanks. Further it is proposed that the payload bay 47 be pressurized to approximately 22 PSI absolute during launch so that the payload bay 47 may be designed in tension.

As the vehicle exits the atmosphere the pressure in the payload bay 47 may be vented and reduced to sea level pressure as out side pressure falls so the pressure differential remains constant or increases. The time during which the pilot 51 or passengers are at the higher pressure may be only a few minutes immediately proceeding launch and extending through some portion of the first stage burn.

By employing a monocoque design the tank walls 61 and outer structure contains most of the structural weight of the vehicle. This has several advantageous results. First a lower strength more ductile material such as aluminum alloy 5056 may be used for the vehicle structure. The use of a more ductile material results in a better critical crack structure which has a longer service life. A second benefit is that considerable heat sink capability is available in the vehicle external skin with the result that very little heat shielding is required for exit aeroheating because the vehicle walls 61 can absorb considerable heat before dramatically increasing in temperature.

It is contemplated that the upper portions of the vehicle would be coated with a high temperature paint containing micro balloons. The heat shield 53 need only cover the base 33. The heating on the base 33, because of the wide radius of curvature, would be expected to be in the neighborhood of 2,600 degrees Fahrenheit if a non-catalyzing ceramic blanket material 55 is used. Other materials which could be used for the reentry heat shield 53 include INSUL/RITE manufactured by FIBERITE for example material MXE-C926. These fiber materials consist of graphite woven cloth impregnated with rubber or rubber like compounds which are a combination of an ablater and a charring material which forms a ceramic coating. A layer of FIBERITE material especially during initial reentries of a prototype vehicle would provide high margins of safety in the same way the RTV rubber used to attaches the Shuttle Tiles forms a backup ablative heatsheild. The material functions like an ablater while at the same time forming a ceramic like surface which reradiates heat. Thus if the heating level does not exceed some threshold the material becomes a permanent heat shield and does not require replacing. On the other hand should excessive heating be experienced its only consequence would be wearing away a portion of the heat shield 53. Other concepts which could be used are a water or hydrogen wall cooling system.

Because a ballistic reentry vehicle has a relatively low integrated heat load of two or three thousand BTU's per square foot, a heat shield which boils water or heats gaseous hydrogen would require only a few hundred pounds of water or hydrogen to cool the heat shield 53. Another alternative is to employ an advanced rechargeable ablater such as a zeolite which can contain 30 or 40 percent of its weight in water locked in molecular channels which will release under reentry heating. Another possible rechargeable ablater would employ a chemical compound such as magnesium sulfate in a durable matrix which would release water of hydration during reentry. Water which is supplied to the heat shield so as to act as an ablater can have a heat of ablation of 3,000 to 5,000 BTU's per pound thus significantly reducing the quantity of water needed as opposed to a simple water wall heat shield.

Because the engines 25 are mounted in the base 33 they must be protected from reentry heating. FIG. 2 shows a deployable ceramic blanket 30 similar to a umbrella which covers the engines 25. Another approach is to cool the engine compartment 37 with a water spray alone or in combination with bleeding hydrogen through the engine expansion nozzles. Yet another approach is to gimbal the engine about the exit plane which is feasible because the upper stage requires only 1-3 degrees of thrust vector control on the engines 25. If the engines 25 are gimbaled about the exit plane the bell of the engines 25 may be integrated into the heat shield 53. If the engines 25 are integrated they may be cooled by bleeding a few pounds of hydrogen through each engine.

FIG. 2B shows a deployed parawing 16 and the stowed parawing 18. From time to time some effort has been devoted to developing a reusable cryogenic insulation. To date the solution is not universally agreed upon. However a recently developed material known as Solimide which can be a porous or non-porous, is a Kapton polyimide foam and is available from Boyd Corporation, 6630 Owens Drive, Pleasanton, Calif. 94566 and also IMI-TECH CORPORATION, 701 Fargo Avenue, Elk Grove Village, IL 60007. A material conforming to specification 301 GC which is coated with a glass cloth and being perhaps one to three inches thick appears ideally suited for use in a hydrogen tank insulation 59. The material has a published operating temperature of −300 Fahrenheit and appears to be usable at hydrogen temperatures. A typical material has a density of 0.6 pounds per cubic foot and a maximum use temperature in excess of 500 degrees.

Oxygen tank insulation is not as critical as hydrogen tank insulation 59. A hydrogen tank must be insulated to prevent air from condensing on the tank surface which results in rapid heat transfer and can lead to explosions. It is possible because Solimide is oxygen-resistant that it or Teflon foam could be used internal to the oxygen tank. Additional foam preferably Solimide should line the oxygen and hydrogen bulkheads where they form the payload bay 47.

The upper stage 24 functions essentially totally outside the atmosphere. Thrust vector control on the upper stage engines 25 may be quite limited and control could even be affected by the movement of a controlled mass such as the rapid pumping of a quantity of mercury about the exterior of the vehicle. In any event the thrust vector control requirements are small. Further, because of minimal loads during second stage flight, sloshing is less of a problem and therefore slosh baffles are not expected to be necessary.

A vehicle having tank walls 61 one tenth of an inch in thickness of aluminum would have a weight of 1.4 pounds per square foot. If two inches of Solimide foam are added to the interior of the tank the tank wall weight is increased by a tenth of a pound. Thus a vehicle skin weight of approximately 1.5 pounds per square foot would typically be able to absorb 112 BTU's per square foot before exceeding 400 degrees. Exit heating is less than 50 BTUs on most parts of the vehicle. 112 BTU's is considerably more than the one or two percent of the total heat load which typically is transmitted by reusable ceramic blanket materials such as developed for shuttle use. If the total integrated heat load is 3,000 BTU's per square foot during the reentry and two percent of that must be absorbed by the vehicle that represents 60 BTU's or slightly more than half the temperature capability of the hydrogen tank wall.

Thus the overall structural concept for the upper stage facilitates determining the cost of and producing the upper stage. An Aluminum monocoque vehicle structure produces a design that is low in developed cost and has high assurance of feasibility. Because the vehicle is shaped like a cone and uses simple geometry, aerodynamic exit and reentry characteristics may be readily predicted from existing aerothermodynamic models. Thus extensive wind tunnels tests are not required and considerable cost savings may be effected in design and development.

Because the vehicle reenters ballistically and has large radiuses of curvature on the base 33 which acts as the heat shield, the reentry environment is relatively mild both in maximum heating and in integrated heating. The use of a welded monocoque aluminum structure in which the tanks, engine mount, and payload bay 47 are a single integrated monocoque structure which may be designed in tension, results in low cost design, development, and production for the vehicle structure.

Because of the unique trajectory the vehicles uses it is able to utilize existing Pratt & Whitney engine technologies and thereby avoid the prohibitive expense of developing a new engine. Further the RL-10 engine, while originally designed to be expendable and currently employed in that mode, in fact has been run for as much as three to four hours with some engine components going ten. Thus it is thought that the existing engines 25 might achieve 100 flights with perhaps periodic maintenance after 25 flights on the pump gear train.

The use of the RL-10 engines 25, which in reasonable numbers cost between two and six million dollars a piece, allows a reasonable estimation of the production cost of the upper stage 24. At three million dollars each the engines 25 would cost $18 million. The vehicle is reasonably estimated at costing three times the engine cost so the first stage 24 might be expected to cost $54 million or less. The lower stage if costing the same would bring the total price of the vehicle to $108 million or in the same ball park as a modern jet transport.

If for 100 flights routine maintenance and operating costs were identical to the procurement costs the cost per flight would be $2.16 million. With a nominal payload of two tons the cost per pound would be $540 per pound transported to orbit. The costs cited herein tend to be on the pessimistic side. Engines designed for many hundreds of flights without extensive maintenance appear readily feasible using the low pressure expander cycle utilized by the RL-10. Improved engine life together with engines of higher performance (which increased the vehicle payload by 20 to 40 percent) will substantially lower the cost below $540 per pound.

The first stage 22 is relatively unsophisticated and should not cost nearly as much as the upper stage and it may not be necessary to have one lower stage for each upper stage. Further the cost of propellants for a single flight is on the order of $100,000. Thus the probability that the cost per flight will fall to under a million dollars with a result in payload costs falling under two hundred dollars per pound. If larger vehicles were designed utilizing the technology and approach set forth herein and if fully utilized i.e. over 100 flight per year per vehicle they would tend to be more efficient and have lower cost.

It should be realized however that if a relatively small production run of 100 vehicles having a payload of two tons were flown once a week the payload transported to low earth orbit would be 20 million pounds a year. The vehicle is manned on the basis that any reusable vehicle which is sufficiently reliable to be cost effective will be sufficiently safe for manned operation. Further the addition of on-board personnel saves weight and increases redundancy by allowing such tasks as payload deployment and assembling to be accomplished with relatively unsophisticated light weight mechanisms.

The life support system may be relatively unsophisticated consisting of high pressure regulated air supply which is simply vented overboard. Using modern high pressure composite gas bottles air at extremely high pressures may be stored in relatively light weight pressure vessels. The availability of large amounts of compressed gas allows the complete evacuation of the payload bay 47 and the deployment of the payload followed by repressurization. In addition compressed air can be used for attitude control resulting in a light weight low cost RCS system.

Where higher performance is required of the RCS system beyond the 60 to 70 seconds ISP which a cold gas system using air can produce, the air may be catalytically burned with one or two percent hydrogen by weight to produce an ISP comparable to a mono propellent attitude control system. Light weight high pressure gas tanks 63 for use in the RCS system can be obtained from Ardé Inc. at 500 Walnut Street, Norwood. N.J. 07648.

The vehicle proposed herein is particularly suitable for use with a fluidic attitude control system. Because the first stage 22 which burns within the atmosphere is always flying at constant attitude it could be easily designed to employ fluidic rate sensors which drive fluidic actuators to control the vehicle's attitude. Whether the fluidic controls are primary or backup, there is the advantage is of being independent of computer software and electric power and thus sufficiently robust to withstand lightning strikes which can threaten a conventional vehicle. Such systems can be procured from Garrett Fluid Systems Company, Tempe, Ariz. Similarly the upper stage has a relatively unsophisticated flight profile and it appears likely that with fluidic control the pilot would be able to fly it into orbit without electrical power. This capability significantly increases the overall reliability of the system.

It should be understood that propellant tanks for deorbit could be installed in the LH2 and the Lox tank and slush propellants could be formed within the tanks by drawing a vacuum on the deorbit tanks 65 while the tanks 65 are submerged in the boost propellants. This would condition the deorbit propellants for on-orbit hold.

It should be understood that vertical launch and recovery of the first stage 22 is complicated by the rotation of the earth beneath the vehicle and thus the Vertical Launch is hear defined so as to include the minor variation necessitated by practical consideration such as the earth's rotation.

It should also be understood that a SSME such as used by the Shuttle could be employed in accordance to this disclosure to construct a vehicle having a GLOW of 1,200,000 lbs and a payload of 25,000 lbs.

It should be further understood that air gels as developed by the National Labs might be used as light weight cryogenic insulation.

It should be understood that the invention is not limited to the particular construction and arrangement of parts herein illustrated and described, but embraces such modified forms thereof as come within the scope of the following claims.

I claim:

1. A method of launching payloads to earth orbit employing a two stage liquid fueled launch vehicle comprising the steps of:
   a) placing a payload on an upper stage having a velocity capability of between 24,000 ft/sec and 27,000 ft/sec when carrying the payload;
   b) placing the upper stage on a lower rocket propelled stage having a characteristic velocity capability of 4,000 to 10,000 ft/sec when carrying the upper stage and payload; and
   c) launching the two stages from a launch site, wherein the lower stage is launched substantially vertically during its entire powered flight so the lower stage may be recovered at the launch site.

2. The method of claim 1 wherein the upper stage has a characteristic velocity of between about 24,000 and about 25,500 ft/sec.

3. The method of claim 1 wherein the upper stage has a payload bay between propellant tanks and the payload bay is pressurized above the atmospheric pressure of the surrounding environment during launch.

4. The method of claim 1 wherein the lower stage has a thrust to weight ratio of about 1.6.

5. The method of claim 1 wherein the lower stage thrusts during takeoff at a thrust greater than the weight of the vehicle and after the vehicle achieves a velocity of greater than 2,000 ft/sec. thrusts at a thrust of less than the weight of the vehicle until the vehicle leaves the atmosphere.

6. A two stage liquid fueled launch vehicle comprising:
   a) a first stage having a thrust to weight ratio of between 1.4 and 1.8 and a mass ratio when co-joined with a second stage of between 1.6 and 2.6; and
   b) the second stage having a thrust to weight ratio of between 1 and 2 and utilizing hydrogen and oxygen as primary propellants and having a characteristic velocity of between 23,800 and 27,000 ft/sec when the second stage has a payload of between 2 and 9 percent of the gross weight of the second stage.

7. The vehicle of claim 6 wherein the second stage has a characteristic velocity of between about 240,000 and 25,500 ft/sec.

8. The vehicle of claim 6 wherein the second stage has a payload bay between propellant tanks and the payload bay is pressurized to a pressure greater than the earth's atmosphere adjacent to the vehicle during launch.

9. The vehicle of claim 6 wherein the lower stage has engines capable of thrusting at less than 20 percent of takeoff weight of the vehicle.

10. A method of employing a two stage liquid fueled reusable launch vehicle to transport payloads to earth orbit comprising the steps of:
    a) launching a two stage vehicle from a launch site, the vehicle having a lower stage and an upper stage, and flying the vehicle along a vehicle flight path which is substantially vertical during the lower stage powered flight;
    b) separating the upper stage from the lower stage wherein the upper stage at separation has a vertical velocity of at least 2,000 ft/sec so the upper stage can achieve orbit with a velocity change capability of between 24,000 ft/sec and 27,000 ft/sec;
    c) recovering the lower stage at the launch site;
    d) flying the upper stage into orbit with a characteristic velocity for the stage of between about 24,000 ft/sec and about 27,000 ft/sec; and
    e) recovering the upper stage.

11. The method of claim 10 wherein the method of recovery of the lower stage is by controlled descent with airbreathing engines.

12. The method of claim 10 wherein the method of recovery of the upper stage is by controlled descent by aerodynamic reentry followed by parawing deployment.

13. The method of claim 10 wherein the vehicle flight path which is substantially vertical during the lower stage powered flight is divided in to a first portion where the vehicle has a thrust to weight ratio of greater than 1.2 and a second portion where the vehicle has a thrust to weight ratio of less than one and where in the thrust during the second portion is such that the vehicle first stage burns out above atmosphere so staging can take place outside the atmosphere.

14. The method of claim 10 wherein upper stage at separation has a sufficient vertical velocity so the upper stage can achieve orbit with a velocity change capability of about 25,000 ft/sec.

15. The method of claim 10 wherein the upper stage is construed of a essentially aluminum monocoque structure.

16. The method of claim 10 wherein the upper stage of the vehicle has a oxygen tank mounted above a hydrogen tank and a payload bay there between.

* * * * *